April 26, 1966  L. W. WELLS  3,248,164
MOTION PICTURE FILM AND PROJECTOR
Filed Feb. 11, 1963  6 Sheets-Sheet 1

INVENTOR.
LEON W. WELLS
BY Lyon & Lyon
ATTORNEYS

April 26, 1966   L. W. WELLS   3,248,164
MOTION PICTURE FILM AND PROJECTOR

Filed Feb. 11, 1963   6 Sheets-Sheet 2

INVENTOR.
LEON W. WELLS
BY Lyon & Lyon
ATTORNEYS

INVENTOR.
LEON W. WELLS
BY Lyon & Lyon
ATTORNEYS

April 26, 1966     L. W. WELLS     3,248,164
MOTION PICTURE FILM AND PROJECTOR
Filed Feb. 11, 1963     6 Sheets-Sheet 4
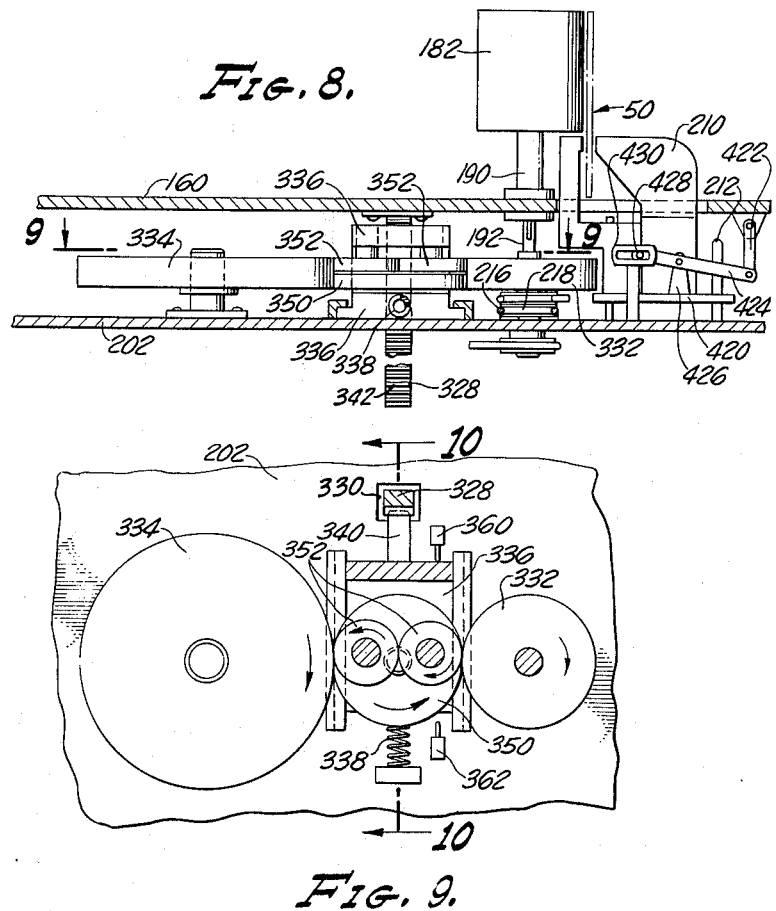
FIG. 8.
FIG. 9.
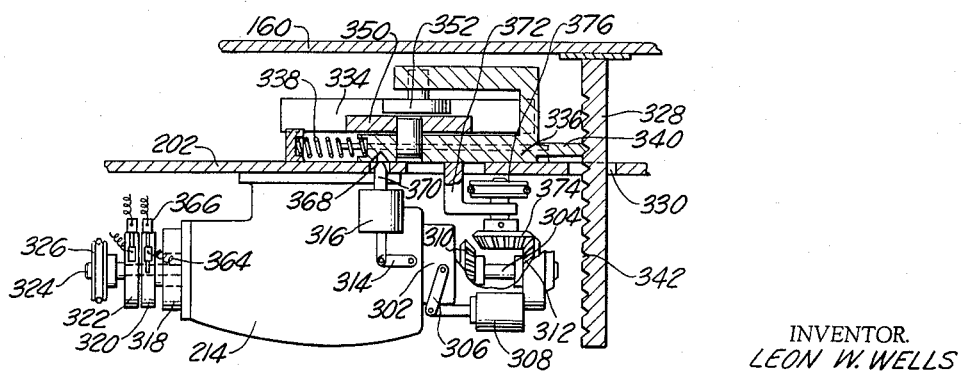
FIG. 10.
INVENTOR.
LEON W. WELLS
BY Lyon & Lyon
ATTORNEYS INVENTOR.
LEON W. WELLS
BY Lyon & Lyon
ATTORNEYS April 26, 1966 L. W. WELLS 3,248,164
MOTION PICTURE FILM AND PROJECTOR
Filed Feb. 11, 1963 6 Sheets-Sheet 6
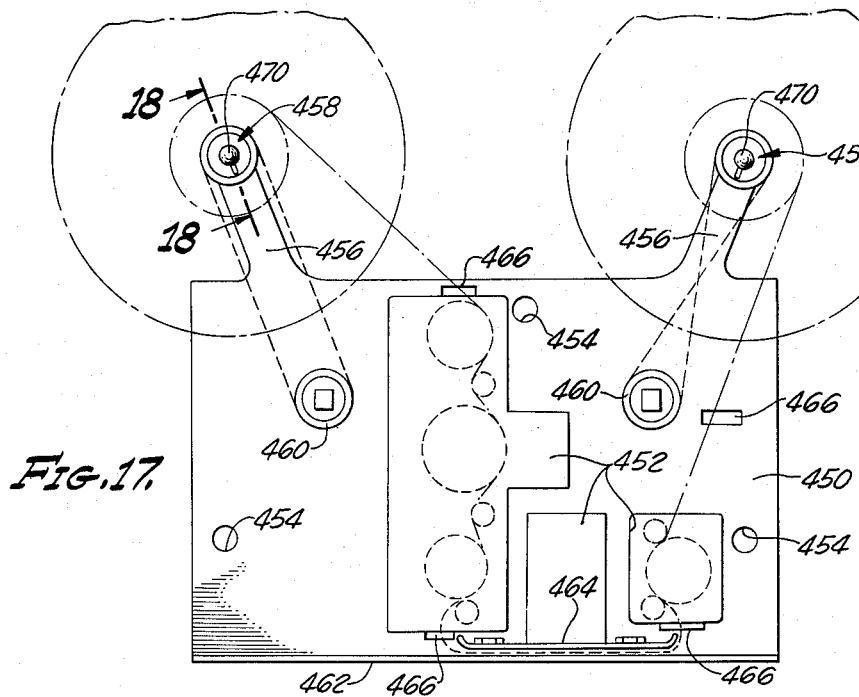
FIG. 17.
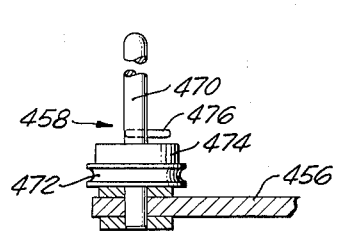
FIG. 18.
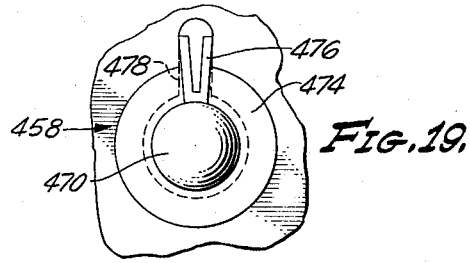
FIG. 19.
FIG. 20.
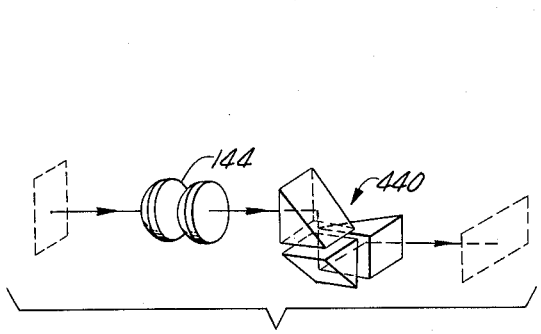
FIG. 21.
INVENTOR.
LEON W. WELLS
BY Lyon & Lyon
ATTORNEYS

United States Patent Office 3,248,164
Patented Apr. 26, 1966

3,248,164
MOTION PICTURE FILM AND PROJECTOR
Leon W. Wells, Fort Lee, N.J., assignor to Panopix Research Inc., New York, N.Y., a corporation of New York
Filed Feb. 11, 1963, Ser. No. 257,722
7 Claims. (Cl. 352—29)

This invention relates to a new motion picture film and particularly sound film and also to a novel apparatus for projecting the same. The invention also includes many novel mechanisms of general utility in motion picture projection apparatus.

The quality of sound reproduced from motion picture film is limited by the speed of film travel. Thus, for smaller film, such as 8 mm., the lineal speed of film travel of conventional film, at 24 frames per second, is so relatively low that high frequency sounds cannot be adequately recorded or reproduced. The present invention relates to a novel manner of printing and arranging the successive picture frames on a film so that even 8 mm. pictures can be accompanied by sound of adequate frequency range. Conventional picture film is also wasteful of raw stock since each frame is accompanied by at least one strip of perforations and wasted material on each side of the perforations. Furthermore, enough film of the conventional type to provide a show of from one-half to 1½ hours duration necessitates a pair of inconveniently large reels.

By the present invention, applicant has solved the above-noted defects by printing pictures of normally 8 mm. or 16 mm. size on a wide film, such as 70 mm. in width. This film has only two edge rows of perforations and the picture frames are arranged in a multiplicity of longitudinally extending rows. The frames of each row are arranged in side by side relation, rather than one above the other as is the case with conventional film. As is known, each picture frame is a rectangle and the scene depicted thereon is wider than it is high. In conventional film the frames are placed one above the other. Therefore, any sound optically recorded on the film and related to that particular frame is allowed a linear drive of only the height of a picture frame and the speed of the film is thus so reduced that high frequency sounds cannot be adequately recorded or reproduced.

According to the present invention the picture frames are arranged in longitudinal rows in side by side relation wherein the width of the scene extends along the length of the film. Thus, movement of film for each frame is considerably increased and a greater range of audio frequencies is possible. In addition, by arranging the rows one below the other in relatively close proximity, a longer show can be recorded on a relatively short length of film (as many as 14 rows can be placed on 70 mm. film), thus permitting the use of small reels occupying only a relatively small space and rendering it practical to distribute the film in cartridge form.

The direction of the action sequence in the upper row of frames, for instance, may extend from right to left and the action sequence of successive frames of the next lower row extend from left to right and so on. Thus, in projecting the film, it is first run in one direction to project one row of frame, then the film is stepped laterally to align the next row of frames with the projector and the film is then run in the opposite direction to project the second row, and so on. Sound can also be recorded on such film in a plurality of rows along the one edge of the film strip and a separate sound reproducer sequentially scans successive rows each time the film is moved laterally. By such an arrangement, applicant is able to record shows exceeding one-half hour in length on wide film of about 2¾ inch width and on a reel or roll having an outer diameter of the order of 1½ inches. Obviously, the cost of processing a show on applicant's film is less than for conventional film since the cost of developing and printing 70 mm. is about the same as the cost of developing and printing an equal length of 8 mm. film. This invention contemplates mounting such film in cartridge form, as will be more fully described, and the provision of a novel projection machine adapted to have such cartridges placed thereon for projection of the pictures and which machine is also adapted to project conventionally reeled film.

It is, therefore, an object of this invention to provide an arrangement of picture frames on a moving picture film wherein long shows may be recorded on film occupying smaller reels than heretofore possible.

Another object of the invention is to provide a sound moving picture film wherein a greater length of film moves through a projector per picture frame for providing improved audio frequency range.

Still another object is to provide a cartridge and film of the type described wherein the cartridge need only be placed in proper position on a projecting machine and the film thereby automatically threads itself into the transport mechanism for immediate projection.

A further object is to provide a novel projection apparatus, particularly adapted to receive a cartridge of the type set forth.

A still further object is to provide a projection apparatus for projecting the novel film heretofore referred to and also adapted to project conventional motion picture film, either being projectible directly on an external screen or on the rear face of a built-in screen for front viewing.

An additional object is to provide projection apparatus of the type referred to wherein the film is periodically reversed and intermittently moved through a projection zone for projecting adjacent rows of frames but wherein the sound reproduction is accomplished at a portion of the film caused to move at a uniform rate irrespective of reversals of its direction of movement.

Still another and additional object is to provide a motion picture projection apparatus having many novel mechanisms and structural features of general utility.

Still further object and advantages will become apparent to those skilled in the art as the description proceeds with reference to the accompanying drawings wherein:

FIG. 8 is a vertical section on an enlarged scale taken along the line 8—8 of FIG. 5;

FIG. 9 is a horizontal section taken along the line 9—9 of FIG. 8;

FIG. 10 is a vertical section taken along the line 10—10 of FIG. 9;

FIG. 17 is a plan view of an attachment to adapt the apparatus to the projection of conventional film;

FIG. 18 is an enlarged vertical section taken along the line 18—18 of FIG. 17;

FIG. 19 is an enlarged plan view of the structure shown in FIG. 18;

FIG. 20 is a side elevation of the structure shown in FIG. 19; and

FIG. 21 is a schematic view of an optical device used for converting the projector to project a different type of film.

In nearly all figures some parts are omitted, to simplify the illustration.

Figure 1:
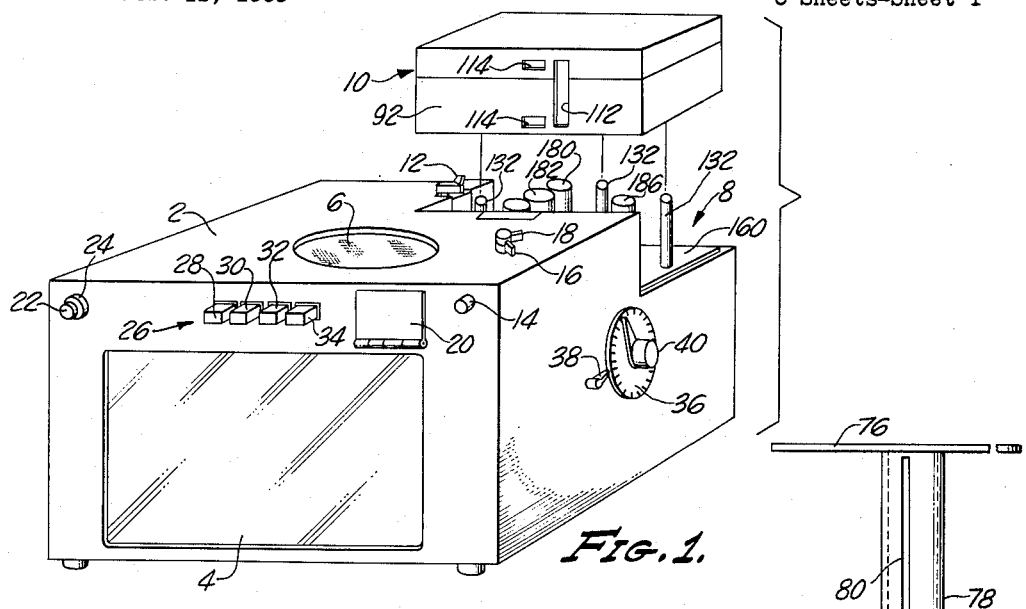
FIG. 1 is a perspective view of a novel projection apparatus embodying the present invention and showing the manner of applying applicant's novel cartridge thereof.

Referring first to FIG. 1 the projection machine comprises a cabinet 2 having a translucent screen 4 in its front surface. The cabinet is provided with a speaker 6 for reproducing recorded sound. As shown, a portion of the cabinet 2 is cut away or recessed at 8 to accommodate a cartridge 10 containing the novel film of the present invention. FIG. 1 illustrates how and where the cartridge is placed on the apparatus, which will be more fully described hereafter.

Also shown on the cabinet 2 are: a cartridge release latch 12, a fine-focus adjustment 14, controls 16 and 18 for changing the optical system in a manner to be described, a swingable door 20 for opening a direct projection aperture, an off-on volume control knob 22, a base-treble control 24 and a group of push buttons 26. The push button 28 is a stop motion control, the pushbutton 30 is a drive reversing control, the push button 32 is to set the machine for the projection of 8 mm. film and the push button 34 is to set the machine for projection of 16 mm. Since sound is sometimes recorded magnetically on motion picture film, it is contemplated that the cabinet will be provided with further controls for recording or playing back such magnetically recorded sound on a film. Numeral 36 designates a footage indicator to show how far the film has progressed from one end to the other and comprises a rotary dial and a fixed pointer 38. Associated with the footage indicator is a manually settable control 40 whereby an operator may set the pointer to an indication representative of a particular portion of the film and then actuate the machine to run the projector forward or reverse until that point on the film is reached and to then proceed by normal projection to show the film from there on.

Figure 2:
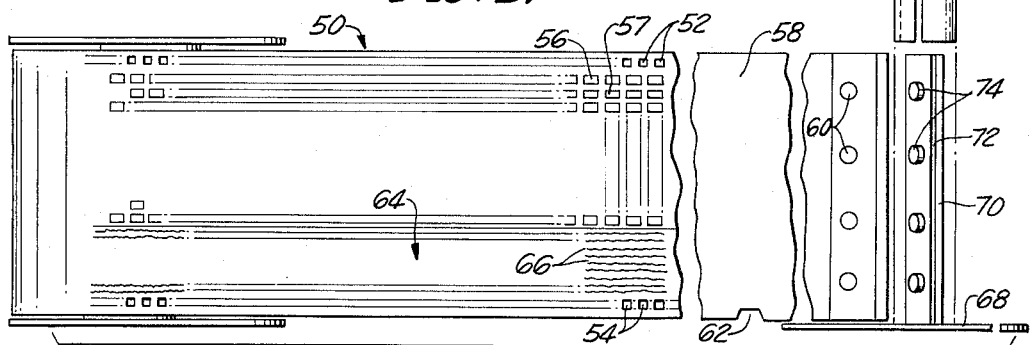
FIG. 2 is a schematic exploded view of a portion of applicant's novel film and a reel therefor.

FIG. 2 is a schematic illustration of the novel film of the present invention and a reel. The film 50 as shown represents a standard 70 mm. film having an upper row of perforations 52 and a lower row of perforations 54. The picture frames or individual scenes are arranged with their long dimension extending longitudinally of the film and in a multiplicity of rows 56, 57, etc. The scene depicted by the frames of the rows 56 and 57 are upright as viewed in FIG. 2, in other words, the frames are arranged side by side and it is to be noted that the frames of each row are directly above or below frames in the adjacent rows. A leader portion 58 extends from the portion of film 50 carrying the picture frames and terminates in an end portion provided with a plurality of openings 60.

The other end of the film (not shown) is also provided with a leader portion and each leader portion is provided, at its lower edge, with a notch 62 for a purpose to be described. As is obvious, many rows of picture frames may be printed on the film 50 without having to provide a separate row of perforations 52 for each row of picture frames and it is to be further stated that the action sequence of the row 56 extends, for example, from right to left whereas the action sequence of row 57 would extend from left to right. In other words, action progresses along the row 56 from right to left and the first frame at the left end of row 57 follows the frame of row 56 immediately thereabove. In projecting such film, the row 56 is first caused to move through the projection apparatus from left to right while projecting the frames thereof and when the last frame of row 56 enters the projector optical axis, a notch 62 actuates a switch to initiate operation of mechanism to lift the film through one step equal to the spacing between the rows 56 and 57 whereupon the row 57 is then aligned with the optical axis of the projector. At the same time reversal of the direction of movement of the film is effected so that row 57 is then projected until the last frame thereof is reached whereupon the above sequence is repeated until all rows have been projected.

The numeral 64 of FIG. 2 indicates a band of separate sound tracks 66, there being one sound track for each horizontal row of picture frames. The apparatus to be described hereafter includes means for scanning and reproducing the sound recorded on each track 66 simultaneously with the projection of a corresponding row of pictures. Since each sound track is considerably narrower than each row of picture frames, the sound tracks do not need to occupy as much lateral space on the film as the picture frames. More will be said about this later.

The right hand portion of FIG. 2 shows a novel reel comprising a lower flange 68 having a tubular core 70 provided with a longitudinal slit 72 and a plurality of projections 74. The other half of the reel comprises an upper flange 76 and a tubular sleeve 78 having a longitudinal slit 80. The inner diameter of the sleeve 78 is at least equal to the outer diameter of core 70, plus the height of projections 74. Thus, the end of film 50 may be inserted in the slit 72 and openings 60, then placed in embracing relation to projections 74 and the film wound at least a partial turn around the core. Thereafter, the sleeve 78 is telescoped over the core 70, with film 58 projecting out through slit 80 and the film and reel are then firmly located in assembled relation.

Figure 3:
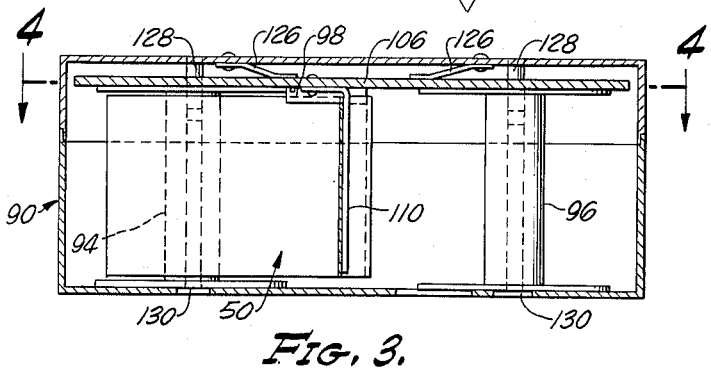
FIG. 3 is a vertical sectional view taken generally along the line 3—3 of FIG. 4 through the film cartridge.
Figure 4:
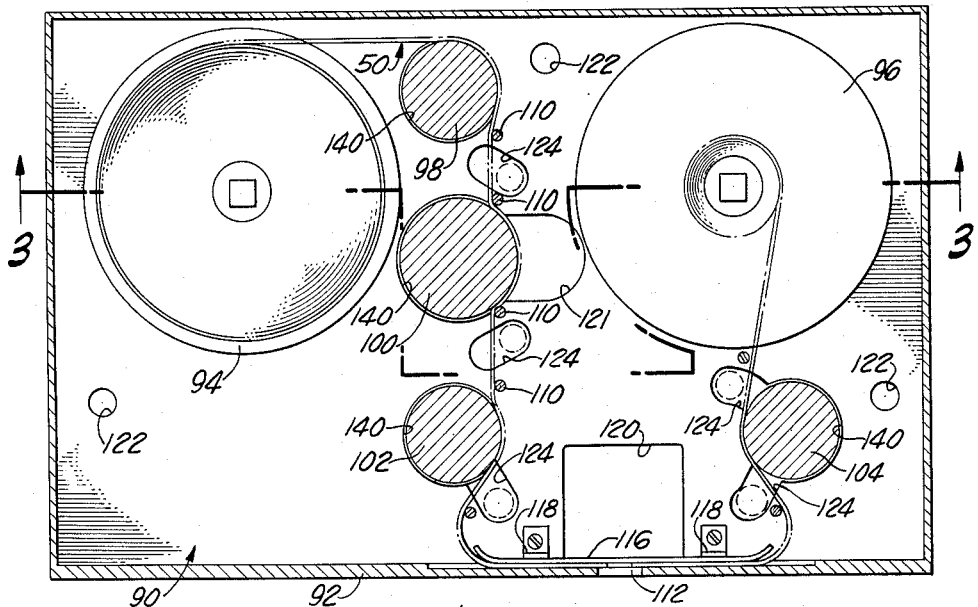
FIG. 4 is a horizontal section through the film cartridge, taken along the line 4—4 of FIG. 3.
Figure 5:
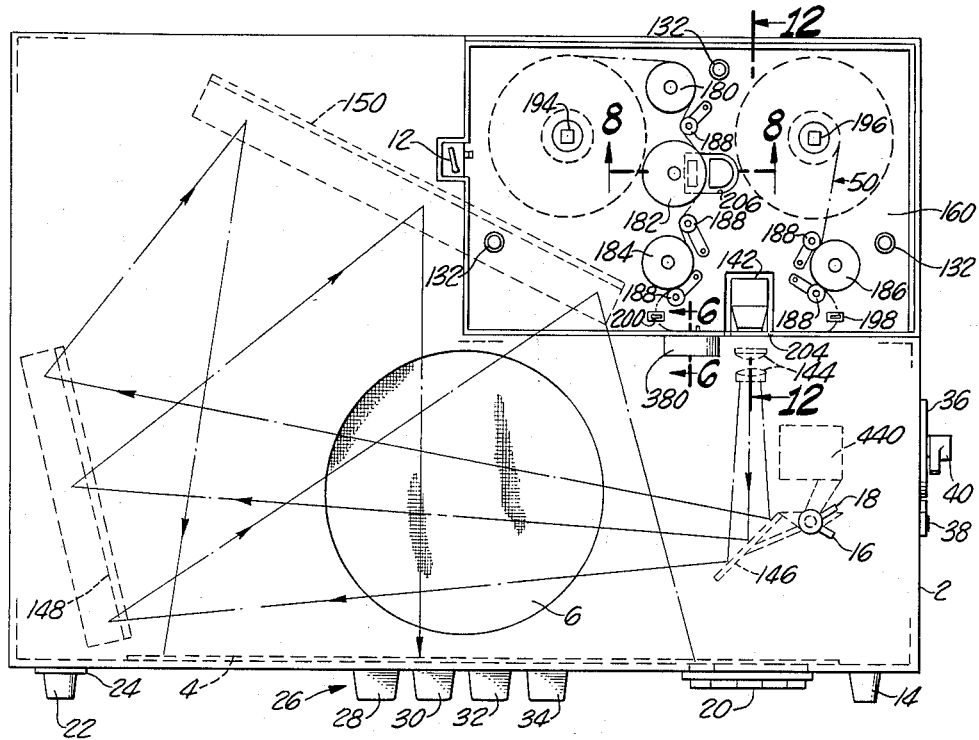
FIG. 5 is a schematic top plan view of the projection machine shown in FIG. 1.

From FIG. 5 it will be seen that the projection machine includes a number of upstanding devices comprising a transport mechanism through which film is to be threaded along a predetermined devious path. The cartridge of FIGS. 3 and 4 is designed to hold a film in such manner that the cartridge need only be placed on the machine, as suggested in FIG. 1, whereupon the film is immediately in proper threaded relation to the transport mechanism and ready for immediate projection.

Referring first to FIG. 4, the cartridge comprises a suitable, preferably rectangular, container 90 having a front edge wall 92. A film supply reel 94 is positioned in the container as is a take-up reel 96. The film 50 is already attached to the reels 94 and 96 and arranged along substantially the desired devious path by being trained around bosses 98, 100, 102 and 104, projecting downwardly from an upper plate 106 (FIG. 3). The bosses referred to are fixed on the plate 106 and project downwardly only a short distance so that they engage only the upper edge of the film 50. A plurality of downwardly extending fingers 110 are carried by the plate 106 and engage that face of film 50 opposite the face that engages the bosses just described and thereby hold the film in a desired path.

The front edge wall 92 of the container 90 is provided with a vertical slot 112 (see also FIG. 1) which extends vertically at least throughout the vertical extent of the rows of picture frames on the film 50. The front wall 92 is also provided with a pair of horizontal elongated slits 114 for a purpose to be described later. The film 50 is directed from the boss 102 into an accumulation loop portion and thence along the inner face of the front edge wall 92 so that it covers the slot 112. A spring pressed plate 116 is mounted on the inside of the cartridge container to frictionally press a portion of the film 50 against the front edge wall 92 and to guide the same past the slot 112. The plate 116 is resiliently supported and pressed outwardly by a pair of spring fingers 118 (see also FIG. 6). The bottom wall of the container 90, as seen in FIG. 4, is provided with a plurality of openings 120, 121 and 122, and a plurality of slots 124.

Referring now to FIG. 3 it will be seen that the upper plate 106 upon which the bosses 98–104 and the fingers 110 are mounted, is vertically movable inside the container and is normally spring pressed downwardly by leaf springs 126. The plate 106 is guided for vertical movement by pins 128 carried by the top wall of the container 90 and which project downwardly therefrom through the plate 106. The pins 128 also enter the hollow spindles of the reels 94 and 96 to thereby hold the same in proper position in the container with the central openings of those reels aligned with bottom openings 130 in the bottom wall of the cartridge. The openings 122 in the bottom wall (FIG. 4) correspond in position to upstanding pins 132 (see FIG. 1) on the projection machine whereby the cartridge is properly located on the machine when placed thereon. The locking pins 132 extend upwardly sufficiently far so that when the cartridge is placed on the machine, the pins project upwardly through openings 122 and engage and lift upper plate 106 to free the bosses 98–104 from the film and to release the reels 94 and 96 for rotation. It is to be noted that when the cartridge is not on the machine, the plate 106 is pressed downwardly into braking engagement with the film reels to prevent inadvertent rotation thereof.

Figure 11:
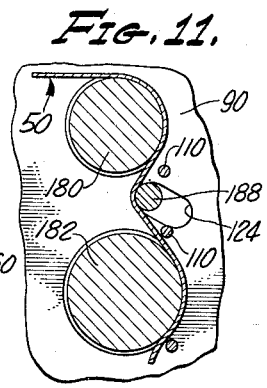
FIG. 11 is a horizontal sectional view on an enlarged scale of a detail.

The projection machine is provided with a plurality of retractable spring pressed pressure rollers to press the film against the surfaces of friction driving drums, all as will be described. The driving drums correspond in size and position to the bosses 98–104 and so the bottom plate of the cartridge is provided with openings 140 of sufficient size to receive those drums and which openings are positioned directly below the corresponding bosses. The slots 124, previously referred to, accommodate the movable pressure rollers. As seen in FIG. 4, the fingers 110 hold the film in a manner to extend across adjacent slots 124 and the pressure rollers, when in retracted position, occupy the positions suggested by dotted circles in the slots 124 of FIG. 4. As the cartridge is placed on the machine, the bosses 98–104 hold portions of the film in the position to be guided over the drums therebelow. After the cartridge is in position, the pressure rollers are released whereupon they move along their respective slots to engage the film 50 and move the same laterally away from contact with the fingers 110 and into firm frictional pressure engagement with adjacent friction drive rollers, as will be described. See FIG. 11 for a detail showing of the pressure rollers after moving the film away from the fingers 110.

The projection machine as shown in FIG. 5 comprises a cartridge receiving recess, already described, in which a light source 142 is positioned. When the cartridge is in position, the light source 142 is behind the selected row of picture frames and projects a beam of light therethrough and through slot 112 into the main part of the cabinet 2 through a suitable lens system 144. The image then impinges on a vertical mirror 146 and is reflected laterally to a mirror 148. The image is reflected from the mirror 148 in a rearwardly and inwardly direction to a mirror 150 from whence the image is reflected to the rear surface of the translucent screen 4. It is to be noted that the mirror 148 is not only at an angle to the fore and aft axis of the cabinet but is also arranged with its upper edge tilted inwardly so that it reflects its image downwardly toward mirror 150. Mirror 150 then reflects the image slightly upwardly to a centered position on the screen 4. Since projection is on to the rear of a translucent screen, the picture image must be laterally reversed for proper viewing from the front. The provision of three reflecting surfaces accomplishes this result even though the scenes depicted on the film are of normal hand. However, if it is desired to project the pictures directly onto an external screen, the door 20 may be opened and the mirror 146 swung laterally out of the image path, by means of handle 16 of FIG. 1 and the image may then be projected directly onto an external screen and viewed in the conventional manner.

Figure 12:
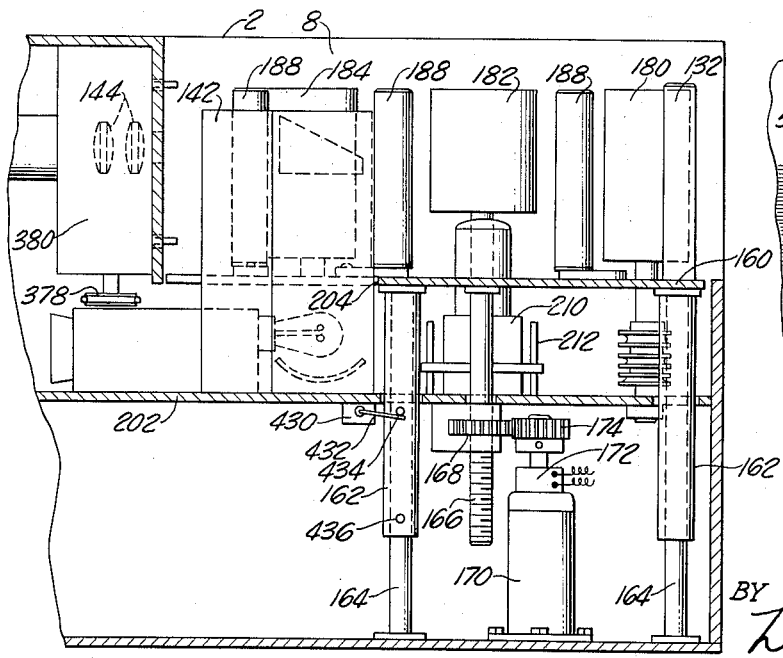
FIG. 12 is a vertical sectional view, on an enlarged scale, taken along the line 12—12 of FIG. 5.

By referring now jointly to FIGS. 1, 5 and 12, it will be seen that the recess 8 is defined by fixed upstanding side walls of the cabinet on two sides of the recess and that the bottom of the recess is defined by a vertically movable platform 160. The platform 160 is provided with downwardly extending rigid guide tubes 162 (see FIG. 12), telescopically engaging upstanding guide rods 164 secured to the base of the cabinet. A threaded rod 166 is also fixed to the under side of the platform 160 and projects downwardly therefrom through a gear nut 168 held against axial movement but mounted for rotation whereupon rotary movement of the gear nut 168 causes vertical movements of the platform 160. A constantly rotating reversible motor 170 drives to one member of a one-revolution clutch 172 to drive output gear 174 which is in mesh with the gear nut 168. The one revolution clutch 172, which is preferably a magnetically engaged clutch which automatically disengages itself after one revolution, is supplied with an actuating pulse of current through the leads illustrated. Such clutches are well known to those skilled in the art and the details thereof need not be set forth herein. The lead of the screw 166 is such that one complete turn of the nut 168 will cause vertical movement of platform 160 equal to the spacing between horizontal rows of picture frames on the film. The control of motor 170 and clutch 172 will be further described.

The platform 160 has the three guide pins 132, previously referred to, fixed rigidly thereon so that when the film cartridge is telescoped over the pins, it is then in proper position on the platform. As shown in FIG. 5, the transport mechanism for the film comprises friction rollers 180, 182, 184 and 186 against which the film is held by pressure rollers 188. The rollers 180, 184 and 186 are film guiding and advancing rollers whereas the roll 182 is a sound drum, as will be described. All of the rollers and the sound drum are rotatably mounted in an upright position on the platform 160 and are provided with hollow spindles (see FIG. 14). This figure shows the sound drum and its hollow spindle 190 rotatably journalled on the platform 160. A drive shaft 192 extends slidably up through and in keyed relation to the spindle 190 so that the platform 160 and drum 182 may move vertically while the drive shaft 192 remains at a fixed elevation. It is to be understood that all of the friction drums shown in FIG. 5 are mounted and driven in the same manner, as are upstanding shafts 194, and 196, which enter the cores of the film reels in the cartridges to thereby drive those reels in the desired manner.

The platform 160 is also provided with a pair of switches 198 and 200 positioned below portions of the film path so that the responsive portions of these switches are engaged by the lower edge of the film 50 and actuated thereby when the notches 62 engage those switches, as will be further described later.

FIG. 12 shows an intermediate partition 202, fixed in the cabinet 2, below the platform 160 and upon which stationary portions of the apparatus are mounted. The platform 160 is provided with a large opening 204 corresponding to the opening 120 in the film cartridge and an opening 206 corresponding to the opening 121 in the film cartridge. The wall 202 supports the light source 142 which projects upwardly into the cartridge. Thus, the platform may move vertically while the focused beam of light projected by means 142 remains stationary. In like manner, a sound detecting and reproducing mechanism 210 is guided by pins 212 for vertical movement relative to the platform 160 and supporting wall 202, in a manner to be described.

Figure 13:
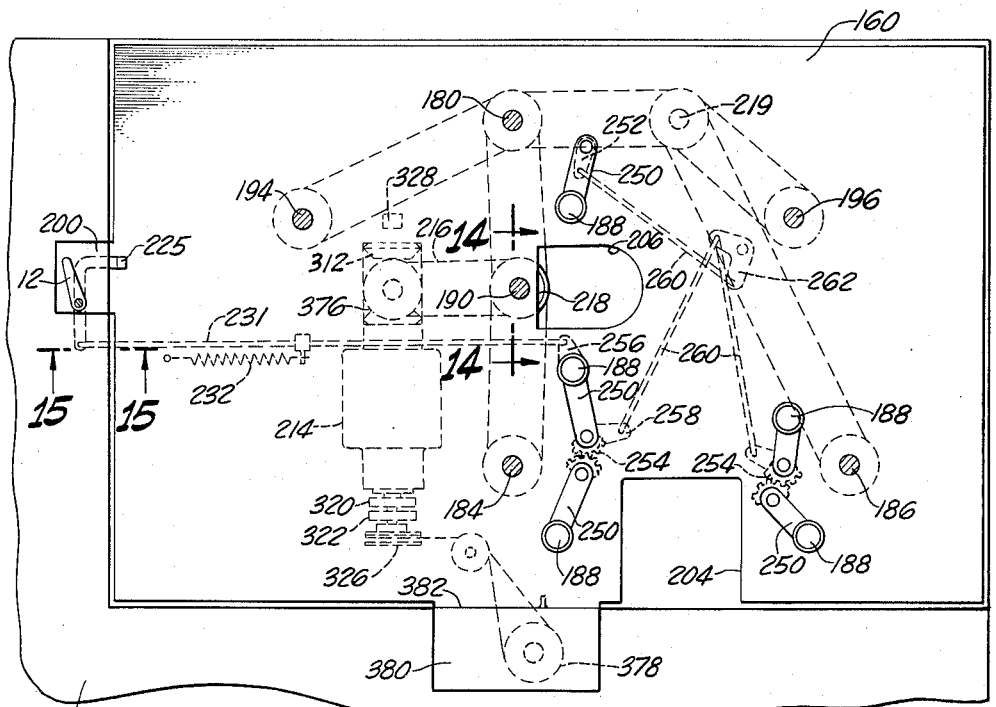
FIG. 13 is a view similar to a portion of FIG. 5 but with certain parts omitted to schematically show the relationship of other related mechanisms.
Figure 14:
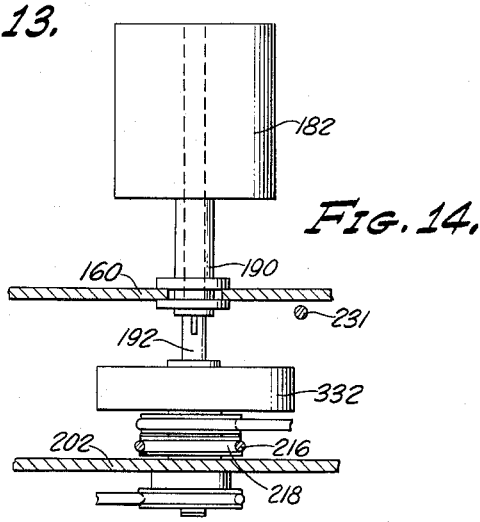
FIG. 14 is a vertical sectional view taken along the line 14—14 of FIG. 13.

Referring now to FIG. 13, numeral 190 schematically represents the spindle 190 of FIG. 14 supporting the sound drum 182. A motor 214 is mounted on the lower surface of wall 202 and provides power for driving the operating mechanisms of the projector. A belt 216 drives a pulley 218 on the shaft 192 which shaft carries a pair of other pulleys, as seen in FIG. 14, driving respectively to the drums 180 and 184. From the drum 180 drive is taken to the reel shaft 194 and to an idler shaft 219, which rotates pulleys to drive the friction roll 186 and reel shaft 196. The drive to the various friction rolls must be a substantially positive drive whereas the drives to the reel shafts are preferably easy-slip drives, as well known to those skilled in the art. The motor 214 and its associated mechanisms will be further described later.

Figure 15:
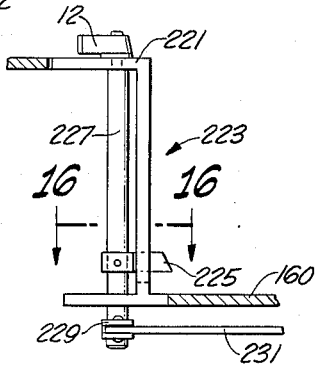
FIG. 15 is an enlarged vertical sectional view taken along the line 15—15 of FIG. 13.
Figure 16:
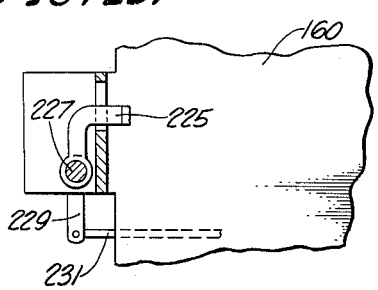
FIG. 16 is a horizontal sectional view taken along the line 16—16 of FIG. 15.

The platform 160 is provided with an extension 221 upon which a latch mechanism 223 is mounted and which latch mechanism is manually operable by handle 12 of FIGS. 1 and 5. FIGS. 15 and 16 show the structure of the latch and it will be seen that a detent 225 is swingable to project outwardly over the platform 160. When in the position of FIG. 15, the detent 225 is in position to engage a suitable opening or recess in an end of the cartridge 10 to thereby lock the cartridge on platform 160. As shown in FIG. 16, the detent 225 extends from one side of a supporting shaft 227, upon which the handle 12 is fixed, and a second arm 229 is fixed to shaft 227 and extends in the opposite direction. Thus, when detent 225 is withdrawn or retracted from the cartridge, a rod 231 pivoted to the arm 229 is pushed to the right, as seen in FIGS. 13, 15 and 16. A spring 232 urges the rod 231 to the left, as seen in FIG. 13. As shown in FIG. 13, the pressure rollers 188 are each mounted vertically for rotation on the outer end of corresponding arm 250 pivoted at its other end to the platform 160 and rigid on a shaft extending downwardly through the platform. As seen in FIG. 13, the arm 250 carrying the pressure roll adjacent drum 180 is provided below the platform with a radial arm 252 whereas the shafts of the two pressure rollers adjacent the drum 184 are provided with intermeshing gear sectors 254, as are the shafts for pressure rollers adjacent drum 186. The rod 231 is pivotally connected to an extension 256 on the arm 250, as shown in FIG. 13, so that retraction of latch detent 225 swings the pressure roller 250 to which rod 210 is attached outwardly to the dotted line position indicated in FIG. 4. At the same time the associated pressure roller is also swung outwardly and an arm 258 is swung in a direction to actuate links 260 and bell crank 262 to simultaneously release all of the pressure rollers 188. Thus, when it is desired to remove the cartridge, mere release of the latch not only releases the cartridge but displaces the pressure rollers so that the film may then engage the finger 110 previously described. Upon such removal the upper plate 106 moves downwardly and positions its bosses to hold the film in the desired devious path. It is to be further noted that application of the cartridge to the platform will result in pushing the detent 225 outwardly and thus release the pressure rolls.

Referring now to FIG. 10, the platform 160 and partition 202 are shown in section. To the under face of partition 202 a motor 214 is fixed. The motor is provided with a gear box 302 adapted to drive shaft 304 at either of two selected speeds. The speed selecting lever 306 is actuated by a solenoid 308 for a purpose and in a manner to be described later. The shaft 304 is provided with two gears 310 and 312 fixed thereon. The motor is also provided with a clutch actuated by lever 314 and solenoid 316 whereby the motor may be disconnected from all drives whenever desired. The other end of the motor drives through a gear box 318 which drives a pair of commutators 320 and 322 at a selected speed, for example, 24 r.p.s. At the same time the gear box 318 drives an output shaft 324 carrying a drive pulley 326 at a fixed speed three times that of the commutators.

Referring now to FIGS. 8 and 9 also, the sound drum 182 is shown and its driving shaft 192 is provided with a friction wheel 332 thereon. It is to be remembered that the film in any motion picture projector moves intermittently through the optical system and if that film is provided with recorded sound the sound detector can operate properly only when the film moves therepast at a uniform and continuous rate. It is to be further remembered that the film in the present instance is alternately moved in one direction and then the other, thus necessitating reversing the direction of rotation of the sound drum 182. To maintain a uniform rate of movement of film past the sound detector, a rather massive fly wheel 334 is journalled on the partition wall 202. A slide member 336 is provided for sliding movement between the periphery of the flywheel 334 and the wheel 332. A spring 338 (see FIG. 10) normally urges the slide 336 to the right, as seen in FIG. 10, or upwardly as seen in FIG. 9. The other end of the slide 336 carries a projection 340 having an end shaped complementary to the notches 342 in the bar 328. The spacing between the notches 342 is twice the spacing between the adjacent rows of picture frames on the film 50. Thus, every time the motor 170 operates to lift platform 160 through one step, the projection 340 is either forced out of a notch onto a crest or off a crest into a notch. It occupies alternate positions during the projection of successive rows of picture frames. When the slide is in the uppermost position, as shown in FIG. 9, a friction wheel 350 journalled thereon, frictionally engages both the flywheel 334 and the wheel 332 whereby the flywheel is drivingly connected to the sound drum to insure uniform rotation thereof. When the slide 336 is at the opposite end of its movement, a pair of friction wheels 352, journalled thereon, are brought into frictional contact with the flywheel and the wheel 332 while the wheel 350 is moved out of contact therewith. Thus, alternate positions of the slide 336 frictionally connect the flywheel to the sound drum for drive in alternate directions. In this manner, the drive to the sound drum is reversed and substantially continuous connection to the flywheel is provided without necessitating reversal of the direction of rotation of the flywheel.

As shown in FIG. 9, the wall 202 supports a pair of switches 360 and 362 in the path of movement of the slide 336. Thus, when the slide is in the position shown in FIG. 9, the switch 360 is actuated whereas when it reaches the other extreme of its movement, the switch 362 is actuated. By referring again to FIG. 10, the two commutators 320 and 322 are each provided with a pair of brushes 364 and 366, for example. The two brushes of commutator 320 are spaced about 60° apart and a lesser distance on commutator 322. Each commutator is provided with a conductive strip extending part way around its periphery a distance equal to the spacing between its brushes, to be engaged by one or the other of those brushes. The purpose for this arrangement will be described later.

The slide 336 is also provided with a notch 368 in its under surface (see FIG. 10) and the solenoid 316 is provided with an armature 370 which not only actuates the clutch lever 314 but also projects upwardly through an opening in wall 202. When the solenoid 316 is actuated to disengage the clutch of motor 214, it also projects the upper armature portion 370 upwardly to engage the notch 368. The armature 370 and notch 368 are formed as cooperating cam members so that the solenoid then enforces movement of the slide 336 to a position midway between its extreme positions and in which mid-position neither the wheels 352 nor the wheel 350 are in engagement with the flywheel or driving wheel 332. Thus, disengagement of the motor clutch not only stops the drive to the shaft 304 but also holds the slide 336 in such position that the flywheel may continue to rotate by virtue of its inertia without being connected to the wheel 332, which at this time is stationary.

As also shown in FIG. 10, the slide 336 is provided with a downwardly extending bracket 372 projecting through a slot in the wall 202 and having journalled thereon a beveled gear 374 and a pulley 376. When the slide 336 is in the position shown in FIG. 10, the gear 374 engages gear 312 to drive pulley 376 in one direction. When the slide 336 moves to the other extreme of its movement, the gear 374 engages gear 310 to thus drive pulley 376 in the opposite direction. The pulley 376 provides the drive for all of the friction drums, previously described, and is identified on the schematic view of FIG. 13.

Figure 6:
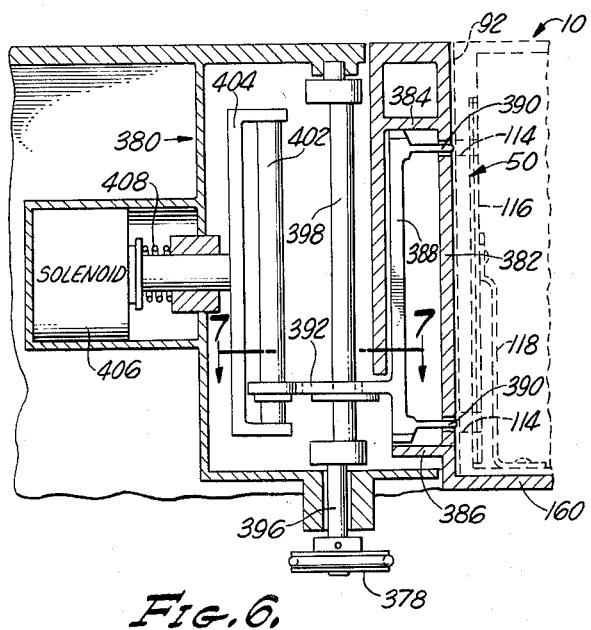
FIG. 6 is an enlarged vertical sectional view taken substantially along the line 6—6 of FIG. 5.
Figure 7:
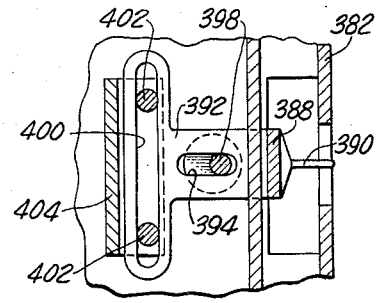
FIG. 7 is a horizontal sectional view taken along the line 7—7 of FIG. 6.

Referring now to FIG. 13, it will be seen that the pulley 326 of the motor 214 drives to a pulley 378 of an intermittent motion mechanism 380. FIGS. 6 and 7 show the structure of the intermittent mechanism, which will now be described. The platform 160 has an upstnading wall 382 in the region alongside the optical system, which wall is co-extensive with the adjacent portions of the cabinet 2. The upstanding portion 382 also supports and defines a chamber or enclosure having upper and lower flanges 384 and 386. A claw member 388 is slidably supported by the walls 384 and 386 and is provided with claw fingers 390 projecting through slots in the wall 388, which slots are in alignment with the horizontal slots 114 of the film cartridge. The claw 388 is formed with a T-shaped flange 392 which is provided with a first slot 394 extending perpendicular to the direction of film movement. The pulley 378 drives a shaft 396 having thereon an eccentrically positioned and elongated crank pin 398 extending through the slot 394. Thus, the crank pin 398 merely reciprocates the claw 388 in a direction parallel to film movement. The flange 392 is provided with a further elongated slot 400 perpendicular to the slot 392 and which embraces a pair of guide rods 402 carried by a yoke 404. The pins 402 thus guide the claw in its sliding movement parallel to film movement. The rods 402 are also elongated in a vertical direction. The yoke 404 is secured to the armature of a solenoid 406 which is urged by a spring 408 toward the left, as seen in FIG. 6. When the solenoid 406 is energized, the yoke 404 is projected to the right and when it is deenergized the spring 408 moves the yoke to the left. The "throw" of crank pin 398 is equal to the greatest distance any film will be moved at each step, in other words, it is at least equal to the length of the longest picture frame to be projected by the machine. Since the crank pin 398 mereley reciprocates the claw 388, obviously the solenoid may be energized at any desired time during a cycle of reciprocation to project the fingers 390 into engagement with the film in cartridge 10 and advance it any desired distance, at the end of which the solenoid is deenergized and the spring withdraws the fingers from the film. Clearly, the mere timing or energization of solenoid 406 will determine the extent of film movement and the direction thereof. As the platform 160 is raised or lowered, the claw 388 moves therewith and always remains opposite the film with its fingers 390 in position to engage the film perforations. Vertical movement is permitted by the elongated nature of crank pin 398 and guide pins 402.

As previously stated, the motor 214 of FIG. 10 may be started and solenoid 308 operated to select a particular speed of operation for shaft 304. Preferably, the speeds available are such that the pulley 376 will move the film at the proper rate for 24 frames per second, which is a different linear rate for 8 mm. and 16 mm. pictures.

When projecting film of the type shown in FIG. 2 and accompanied by sound, the projection rate is always 24 frames per second. However, 16 mm. pictures necessitate moving the film at a greater linear speed than is required when 8 mm. pictures are projected even though the movement of frames per second remains the same. Thus, actuation of the push buttons 32 or 34 will preset the gear ratio in gear box 302 for the particular size picture frame. At either speed, however, the commutators 322 and 320 are driven through gear box 18 at 24 r.p.s. and pulley 326 is driven at 72 r.p.s. regardless of the setting of speed selector 306. Assuming it is desired to project sound film of 16 mm. size, the operation is as follows:

The operator depresses button 34, then places the appropriate cartridge of film on the machine in the manner already described. The switches 198 and 200 on the platform 160 are of a type that produce a single pulse of current when actuated by entering a notch in the film but no pulse when actuated in the other direction. A pulse of current from either of these switches is arranged to effect momentary engagement of the magnetic clutch 172 and thus initiate one revolution of gear nut 168 and elevation of platform 160 through one step. It is contemplated that the rows of picture frames be the same distance apart, whether they be 8 mm. or 16 mm. Upon placing a cartridge in the machine, a notch 62 will fall directly over one of the switches 198 or 200 but will not actuate the same. The operator then turns on the switch 202 to start the motors 214 and 170 and the mahcine immediately starts driving through motor 214 and gear 374 to actuate the friction drums. The pulley 326 drives the intermittent motion pulley 378 at 72 r.p.s. and the machine begins to operate. With the slide 336 at one end of its movement, the switch 360 places one of the commutators 364 or 366 in the circuit of solenoid 406 so as to energize the same at the proper time and project the fingers 390 into the film to sequentially move it through the projection apparatus. Since the pulley 378 turns at 72 r.p.s. and the commutator 320 turns at 24 r.p.s., it will be seen that the selected brush will energize solenoid 406 only once for each third revolution of the shaft 396. This insures that the "pull-down" time is sufficiently short to provide good picture quality without flicker and while the screen is darkened by a suitable shutter (not shown). When the film reaches the end of a row of frames, the notch 62 at the other end of the film engages the nearest of the switches 198 or 200 to thereby pulse the clutch 172 and effect immediate elevation of the platform 160 through one step. Elevation of the platform raises notched bar 328 and shifts slide 336 to reverse the direction of drive to the friction drums and to select the other brush engaging solenoid 320 to thereby project the fingers 390 into the film at the other end of the stroke of claw 388. In this manner the direction in which the intermittent motion mechanism moves the film is reversed. As already described, reversal of the direction of drive to the drums effects a reversal of the driving connection between flywheel 334 and sound drum wheel 332 to insure smooth operation of the sound reproducing mechanism.

At any time during operation the operator may depress the stop motion button 28, which energizes solenoid 316 to disengage the main clutch of the drive and to lock the slide 336 in an intermittent position. Thus, drive to all film moving mehcanisms is stopped and a single frame may be observed on the screen. It is to be noted that when slide 336 is in this intermittent position, gear 374 is out of contact with both gears 310 and 312.

It is contemplated that the operator may also reverse the direction of motor 214 with pushbutton 30 to replay a part of the film or he may accomplish that result by manipulation of the control 40 previously referred to. In this regard it is to be noted that to replay a substantial part of the film, it is not necessary to reverse the machine to play the entire portion backward. It is only necessary to reverse it far enough to reach the proper position along the length of the film at which time the operator may then enforce elevation or lowering of the platform 160 to move backward or forward as many rows of picture frames as desired.

When 8 mm. sound film is projected, the speed control 306 is actuated by pushbutton 32 to reduce the speed of shaft 304 but the speed of commutator 322 and pulley 326 remains the same. Actuation of the selector button 32 also places the commuator 322 in control of solenoid 406 and since its brushes are closer together than those of commutator 320, the fingers 390 will engage the film through a shorter portion of each cycle of claw 388, corresponding to the shorter length of 8 mm. film frames.

As previously stated the rows of sound tracks on the film 50 are closer together than the rows of picture frames. FIG. 8 shows that sound drum 182 does not extend downwardly to the lower edge of the film but stops preferably at the lower edge of the band of picture frames with the sound tracks projecting therebelow. The sound reproducing mechanism 210 consists of a light source and a light sensitive element on opposite sides of the film 50 below drum 182. The sound reproducing mechanism is mounted on an auxiliary platform 420 guided for vertical movement by the pins 212 previously described. A link 422 pivoted to the platform 160 engages a lever 424 which is pivoted intermediate its length to a bracket 426 on auxiliary platform 420. The other end of lever 424 carries a guide pin 428 slidable in a horizontal guide 430 carried by wall 202. Thus, vertical movements of the platform 160 result in a proportionally shorter vertical movement, in the same direction, of auxiliary platform 420 and the sound reproducing mechanism carried thereby.

FIG. 12 also shows a switch 430 mounted on the wall 202 and having an actuator 432 extending into the path of movement of abutments 434 and 436 carried by one of the guide tubes 162. When the switch 430 is in the position shown in FIG. 12, it conditions the supply circuit for motor 170 to direct the same to turn in a direction to lift platform 160. When the platform 160 rises to the limit of its movement, the abutment 436 engages switch 430 to reverse the direction of rotation of motor 170 and to supply continuous current to the clutch 172 whereby the platform 160 is automatically lowered to its starting position whereupon abutment 434 restores the switch 430 to its normal operating position. The switch 430 is also in circuit with the stop motion solenoid 316 so that the film moving mechanisms are stopped during the liwering of platform 160.

FIG. 21 schematically illustrates an optical system comprising prisms for rotating a projected image through 90° about the optical axis. This system of prisms is housed in a support 440 (see FIG. 5) swingably positionable, by handle 18, in the retracted position shown or to extend across the path of the projected image. Thus, conventional motion picture film may be projected onto the screen 4 by positioning the prism system between lens 144 and mirror 146. On the other hand the prism system may be so positioned, mirror 146 withdrawn and the conventional film projected through the opening covered by door 20 onto a conventional screen.

To provide for projecting conventional film, the apparatus of FIGS. 17 through 20 is provided. This comprises a plate 450 of the same size and shape as the bottom wall of the cartridge and provided with large openings 452 to accommodate the film transport mechanism and other devices projecting upwardly from platform 160. Openings 454 embrace the guide pins 132 to properly position the plate on the platform of the machine already described. This adapter is provided with arms 456 having reel spindles 458 journalled on their outer ends. Pulleys 460 are journalled on the plate 450 and are provided with non-circular openings adapted to receive the reel shafts 194 and 196. The pulleys 460 are connected to pulleys on the reel spindles by suitable drive belts. An upstanding front wall 462 and a pivoted pressure plate 464 function in the same manner as corresponding portions of the cartridge, already described. The plate 450 is also provided with upstanding spacers 466 in position to engage the lower edge of a conventional film to hold it at the desired elevation in the apparatus. It is to be noted that once the machine is started with this attachment in place, it continues to operate in the same direction at the selected speed, since no provision is made for actuating the switches 198 or 200. Conventional film without sound is normally projected at 16 frames per second so the motor 214 is slowed down by one-third so that pulley 326 turns 48 r.p.s. and commutator 322 then turns at 16 r.p.s.

The reel spindles 458 comprise a spindle portion 470 journalled in each arm 456 and having a pulley 472 fixed thereon, a stop collar 474 above the pulley and a radially projecting pin 476 a short distance above the collar 474. FIGS. 19 and 20 show that the pin 476 is longitudinally slit in a vertical plane and spread slightly at its outer end. The flange of the film reels, shown in dotted lines, is provided with a radial slot 478 of lesser width than the outer end of split pin 476. FIG. 20 illustrates the fact that the reel may be snapped downwardly over the pin 476, resiliently squeezing its outer ends together and passing over the center thereof until the flange engages stop collar 474. In this latter position the reel is held securely on the spindle and in driving relation thereto.

While a specific embodiment of the invention has been shown and described herein, it is to be understood that the same is merely illustrative of the principles involved and that other modifications falling within the scope of the appended claims are contemplated.

I claim:

1. A machine for projecting sequential images from a motion picture film having a plurality of parallel rows of picture frames extending longitudinally thereof and reproducing sound recorded on said film in a plurality of adjacent sound tracks extending along an edge portion of said film; said machine comprising: projection means and means for guiding said film therethrough; transport means for moving said film in one direction through said projection means to sequentially project the frames of one of said rows; means responsive to entry of the last frame of a row into said projection means for moving said film laterally to present the frames of the next adjacent row to said projection means and for reversing the direction of operation of said transport means to thereby move said film in the opposite direction to sequentially project the frames of the said next adjacent row; a member having said transport means and film mounted thereon and being movable relative to said projection means; means for moving said member in discrete steps, the length of each step being equal to the lateral distance between corresponding points in adjacent rows on said film; said transport means including a friction drum engaging one face of said film throughout only the width thereof occupied by said rows of picture frames, the portion of said film carrying said sound tracks projecting axially from one end of said drum; sound reproducing means for reproducing sound recorded on a single track and having a portion adjacent each side of said projecting portion of said film; said member being movable relative to said sound reproducing means whereby movement of said member to effect porjection of an adjacent row of picture frames also moves said film relative to said sound reproducing means whereby to effect reproduction of the sound recorded on the next adjacent sound track.

2. A machine as defined in claim 1 wherein the lateral distance between adjacent sound tracks is less than the corresponding distance between adjacent rows of picture frames and wherein said sound reproducing means is mounted on a support movable laterally of said film; and means for moving said support simultaneously with said member but through shorter steps.

3. A machine for projecting sequential images from a motion picture film having a plurality of parallel rows of picture frames extending longitudinally thereof: said machine comprising: projection means and means for guiding said film therethrough; transport means, including an intermittent drive mechanism, for moving said film alternately in opposite directions through said projcetion means in discrete steps; said transport means including a sound drum alternately rotatable in opposite directions; reversible driving means for driving said transport means; sound reproducing means adjacent said sound drum for reproducing sound recorded on said film; a rotatably mounted flywheel; transmission means drivingly connecting said sound drum and said flywheel whereby said flywheel enforces uniform speed of rotation of said sound drum; said transmission means comprising a drive-reversing mechanism and means for actuating the same along with reversal of said drive to said transport means whereby said flywheel continues to rotate in the same direction irrespective of the direction of rotation of said sound drum.

4. A machine as defined in claim 3 wherein said mechanism comprises a drive wheel connected to said drum and having a friction surface; a friction surface rotatable with said flywheel; a member movable to two positions between said friction surfaces; a single friction wheel journalled on said member and held thereby in peripheral contact with both said friction surfaces only when said member is in one of said two positions; a pair of friction wheels journalled on said member in peripheral friction contact with each other, the wheels of said pair being respectively in contact with said friction surfaces only when said member is in the other of said two positions; said means for actuating the same comprising means for moving said member from one position to the other.

5. A machine for projecting sequential images and reproducing sound from a motion picture film having a plurality of parallel rows of picture frames extending longitudinally along one portion of the film and a separate corresponding plurality of sound tracks extending longitudinally along another portion of said film; said machine comprising: film projection means and film transport means for moving the film in a given direction and sequentially projecting the picture frames of one of said rows; a driven friction drum engaging said film for passing the film over the drum at a constant rate during movement of the film in either direction; sound reproducing means positioned adjacent said friction drum and the sound track portion of said film for reproducing the sound recorded on a single track; a member having said transport means and said friction drum mounted thereon and said member being movable for moving the film in a lateral direction relative to said film projection means and said sound reproducing means; means for moving said member in discrete steps relative to said film projection means of a length equal to the lateral distance between corresponding points in adjacent picture frame rows and in discrete steps relative to said sound reproducing means of a length equal to the lateral distance between adjacent sound tracks; and means for causing said movement of said member on projection of the last frame of each picture frame row and causing the reversal of the direction of movement of said film transport means and said friction drum whereby the next picture frame row is projected and the next sound track is reproduced.

6. A machine as defined in claim 5 wherein said friction drum is driven by means including a rotatable flywheel for enforcing a uniform speed of rotation of said friction drum throughout the movement of the film in either direction.

7. A machine as defined in claim 5 wherein said sound reproducing means is mounted on a support which is movable relative to both said member and said film projecting means, and said means for causing movement of said member in discrete steps includes means for causing said support and sound reproducing means to move relative to said film projecting means whereby the spacing between corresponding points in adjacent picture frame rows on a film may differ from the distance between corresponding points in adjacent sound tracks on said film.

References Cited by the Examiner

UNITED STATES PATENTS

| | | | |
|---|---|---|---|
| 1,073,411 | 9/1913 | Dressler et al. | 88—19.5 |
| 1,126,436 | 1/1915 | Fisher | 242—71.7 |
| 1,267,411 | 5/1918 | Howell | 88—19.5 |
| 1,455,766 | 5/1923 | Portass | 352—83 |
| 1,561,945 | 11/1925 | Penin | 242—71.2 |
| 2,037,972 | 4/1936 | Gillet | 352—30 |
| 2,384,621 | 9/1945 | Isaac | 242—74 |
| 2,392,492 | 1/1946 | Morgan et al. | 242—74 |
| 2,499,522 | 3/1950 | Nebel | 88—16 |
| 2,505,965 | 5/1950 | Holmes | 88—16 |
| 2,584,733 | 2/1952 | Owens | 242—55.13 |
| 2,661,162 | 12/1953 | Owens | 242—55.13 |
| 2,733,633 | 2/1956 | Wottring | 88—18.4 |
| 2,756,629 | 7/1956 | Isom | 88—18.4 |
| 2,889,123 | 6/1959 | Hayden | 242—68.3 |
| 2,904,277 | 9/1959 | Underwood | 242—68.3 |

FOREIGN PATENTS

| | | |
|---|---|---|
| 1,010,368 | 3/1952 | France. |
| 637,962 | 11/1936 | Germany. |

NORTON ANSHER, *Primary Examiner.*

WILLIAM MISIEK, *Examiner.*

V. A. SMITH, *Assistant Examiner.*